(12) United States Patent
Yang et al.

(10) Patent No.: US 11,576,228 B2
(45) Date of Patent: Feb. 7, 2023

(54) UPLINK PREEMPTION INDICATION ON MULTIPLEXED UPLINK CHANNELS

(71) Applicant: QUALCOMM Incorporated, San Diego, CA (US)

(72) Inventors: Wei Yang, San Diego, CA (US); Seyed Ali Akbar Fakoorian, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 17/003,716

(22) Filed: Aug. 26, 2020

(65) Prior Publication Data
US 2021/0068195 A1 Mar. 4, 2021

Related U.S. Application Data

(60) Provisional application No. 62/892,468, filed on Aug. 27, 2019.

(51) Int. Cl.
*H04W 76/36* (2018.01)
*H04W 72/04* (2009.01)
(Continued)

(52) U.S. Cl.
CPC ........... *H04W 76/36* (2018.02); *H04L 1/1614* (2013.01); *H04L 5/0094* (2013.01); *H04W 8/24* (2013.01);
(Continued)

(58) Field of Classification Search
CPC ... H04W 76/36; H04W 8/24; H04W 72/0413; H04W 72/0446; H04W 72/0453;
(Continued)

(56) References Cited

U.S. PATENT DOCUMENTS

2020/0322971 A1* 10/2020 Jung ................. H04W 72/1268

FOREIGN PATENT DOCUMENTS

| EP | 3855846 A1 * | 7/2021 | |
| WO | WO-2020227103 A1 * | 11/2020 | ........... H04L 5/0053 |
| WO | WO-2020243505 A1 * | 12/2020 | ........... H04B 7/0695 |

OTHER PUBLICATIONS

Interdigital Inc: "Enhanced Inter UE Transmit Prioritization/Multiplexing for eURLLC", 3GPP Draft, R1-1909453, 3GPP TSG RAN WG1 #98, Enhanced Inter UE TX Prioritization Multiplexing, 3rd Generation Partnership Project (3GPP), Mobile Competence Centre, 650. Route Des Lucioles, F-06921 Sophia-Antipolis Cedex, vol. RAN WG1 No. Prague, Czech, Aug. 26, 2019-Aug. 30, 2019, Aug. 16, 2019 (Aug. 16, 2019), XP051766059, 8 Pages, Retrieved from the Internet: URL:http://www.3gpp.org/ftp/tsg_ran/WG1_RL1/TSGR1_98/Docs/R1-1909453.zip [retrieved on Aug. 16, 2019] Sections 1-3.

(Continued)

*Primary Examiner* — Thai Nguyen
(74) *Attorney, Agent, or Firm* — Arent Fox LLP

(57) ABSTRACT

A method of resolving an uplink collision and pre-empting portions of an uplink channel is provided. A UE receives an uplink cancellation indication from a base station. The UE identifies that a UCI transmission on a PUCCH transmission overlaps with a second uplink transmission. The UE determines whether to apply the ULCI to the PUCCH transmission and the second uplink transmission before or after applying a multiplexing rule to resolve the collision. The UE transmits an uplink communication to the base station based on the ULCI and the multiplexing rule.

56 Claims, 13 Drawing Sheets

(51) Int. Cl.
 *H04L 5/00* (2006.01)
 *H04L 1/16* (2006.01)
 *H04W 72/10* (2009.01)
 *H04W 8/24* (2009.01)
 *H04W 72/12* (2009.01)

(52) U.S. Cl.
 CPC ... *H04W 72/0413* (2013.01); *H04W 72/0446* (2013.01); *H04W 72/0453* (2013.01); *H04W 72/10* (2013.01); *H04W 72/1268* (2013.01)

(58) Field of Classification Search
 CPC ............. H04W 72/10; H04W 72/1268; H04W 72/1247; H04W 74/085; H04L 1/614; H04L 5/0094; H04L 5/001; H04L 5/003; H04L 5/0048; H04L 5/0051; H04L 5/0053; H04L 5/0055; H04L 1/1664; H04L 1/1854; H04L 1/1861; H04L 1/1896
 See application file for complete search history.

(56) References Cited

OTHER PUBLICATIONS

International Search Report and Written Opinion—PCT/US2020/048249—ISA/EPO—dated Apr. 1, 2021.
Partial International Search Report—PCT/US2020/048249—ISA/EPO—dated Nov. 27, 2020.
Qualcomm Incorporated: "UCI Enhancements for eURLLC", 3GPP Draft, R1-190728, 3GPP TSG-RAN WG1 #97, 2 UCI Enhancements for eURLLC, 3rd Generation Partnership Project (3GPP), Mobile Competence Centre, 650, Route Des Lucioles, F-06921 Sophia-Antipolis Cedex, France, vol. RAN WG1. No. Reno. Nevada. U.S.A, May 13, 2019-May 17, 2019, May 13, 2019 (May 13, 2019), XP051728722, 13 Pages, Retrieved from the Internet: URL:http://www.3gpp.org/ftp/Meetings%5F3GPP%5FSYNC/RAN1/Docs/R1%2D1907282%2Ezip [retrieved on May 13, 2019] Figures 3-8 Sections 3.1-3.3.
Vivo: "UL Inter-UE Tx Prioritization for URLLC", 3GPP Draft, 3GPP TSG RAN WG1 #98, R1-1908162_UL Inter UE TX Prioritization for URLLC, 3rd Generation Partnership Project (3GPP), Mobile Competence Centre, 650, Route Des Lucioles, F-06921 Sophia-Antipolis Cedex, France, vol. RAN WG1. No. Prague. CZ, Aug. 26, 2019-Aug. 30, 2019, Aug. 17, 2019 (Aug. 17, 2019), XP051764781, 14 Pages, Retrieved from the Internet: URL:http://www.3gpp.org/ftp/tsg_ran/WG1_RL1/TSGR1_98/Docs/R1-1908162.zip, [retrieved on Aug. 17, 2019] Figures 2-6 Sections 2.1-2.7.
Wilus Inc: "On UL Cancellation Scheme for NR URLLC", 3GPP Draft, 3GPP TSG RAN WG1 #98, R1-1909369_Inter_UE_Final, 3rd Generation Partnership Project (3GPP), Mobile Competence Centre, 650, Route Des Lucioles, F-06921 Sophia-Antipolis Cedex, France, vol. RAN WG1. No. Prague, CZ, Aug. 26, 2019-Aug. 30, 2019, Aug. 17, 2019 (Aug. 17, 2019), XP051765976, 5 Pages, Retrieved from the Internet: URL:http://www.3gpp.org/ftp/tsg_ran/WG1_RL1/TSGR1_98/Docs/R1-1909369.zip [retrieved on Aug. 17, 2019] Figures 2-3 Sections 1-4.

* cited by examiner

UPLINK PREEMPTION INDICATION ON MULTIPLEXED UPLINK CHANNELS

CROSS REFERENCE TO RELATED APPLICATION(S)

This application claims the benefit of U.S. Provisional Application Ser. No. 62/892,468, entitled "UPLINK PREEMPTION INDICATION ON MULTIPLEXED UPLINK CHANNELS" and filed on Aug. 27, 2019, which is expressly incorporated by reference herein in its entirety.

BACKGROUND

Technical Field

The present disclosure relates generally to communication systems, and more particularly, to wireless communication involving pre-emption.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

When a user equipment (UE) experiences an uplink collision between two uplink channels that the UE is scheduled to transmit, the UE may multiplex control information, such as uplink control information (UCI), from one uplink channel onto a transmission for another uplink channel. A base station may schedule a UE to transmit an uplink communication at a certain time, and may later send an indication that part or all of the scheduled uplink period is being pre-empted to allow for transmission of a higher priority uplink communication. When the pre-emption is applied to a channel that has a collision with another channel, the resulting communication can vary based on the order in which the pre-emption and the multiplexing are applied.

In an aspect of the disclosure, a method, a computer-readable medium, and an apparatus are provided for wireless communication at a UE. The apparatus receives an uplink cancellation indication (ULCI) from a base station. The apparatus identifies that a UCI transmission on a physical uplink control channel (PUCCH) transmission overlaps with a second uplink transmission. The apparatus determines whether to apply the ULCI to the PUCCH transmission and the second uplink transmission before applying a multiplexing rule for multiplexing the UCI with the second uplink transmission. The apparatus transmits uplink communication to the base station based on the ULCI and the multiplexing rule.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
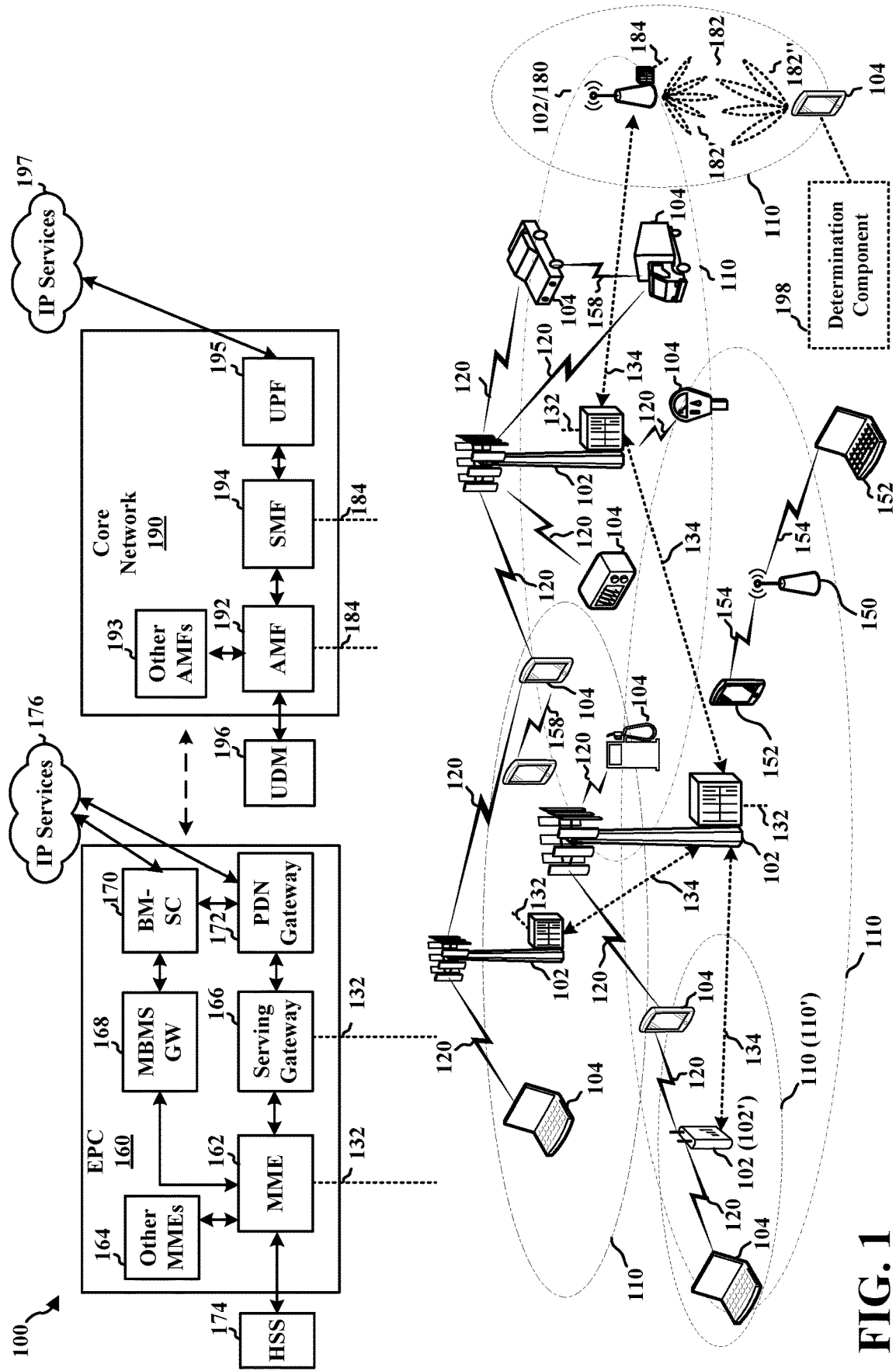
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a determination component 198 that is configured to determine an order for applying UCI multiplexing to resolve an uplink collision and applying ULCI pre-emption. Although the following description may be focused on 5G NR, the concepts described herein may be applicable to other similar areas, such as LTE, LTE-A, CDMA, GSM, and other wireless technologies.

Figure 2:
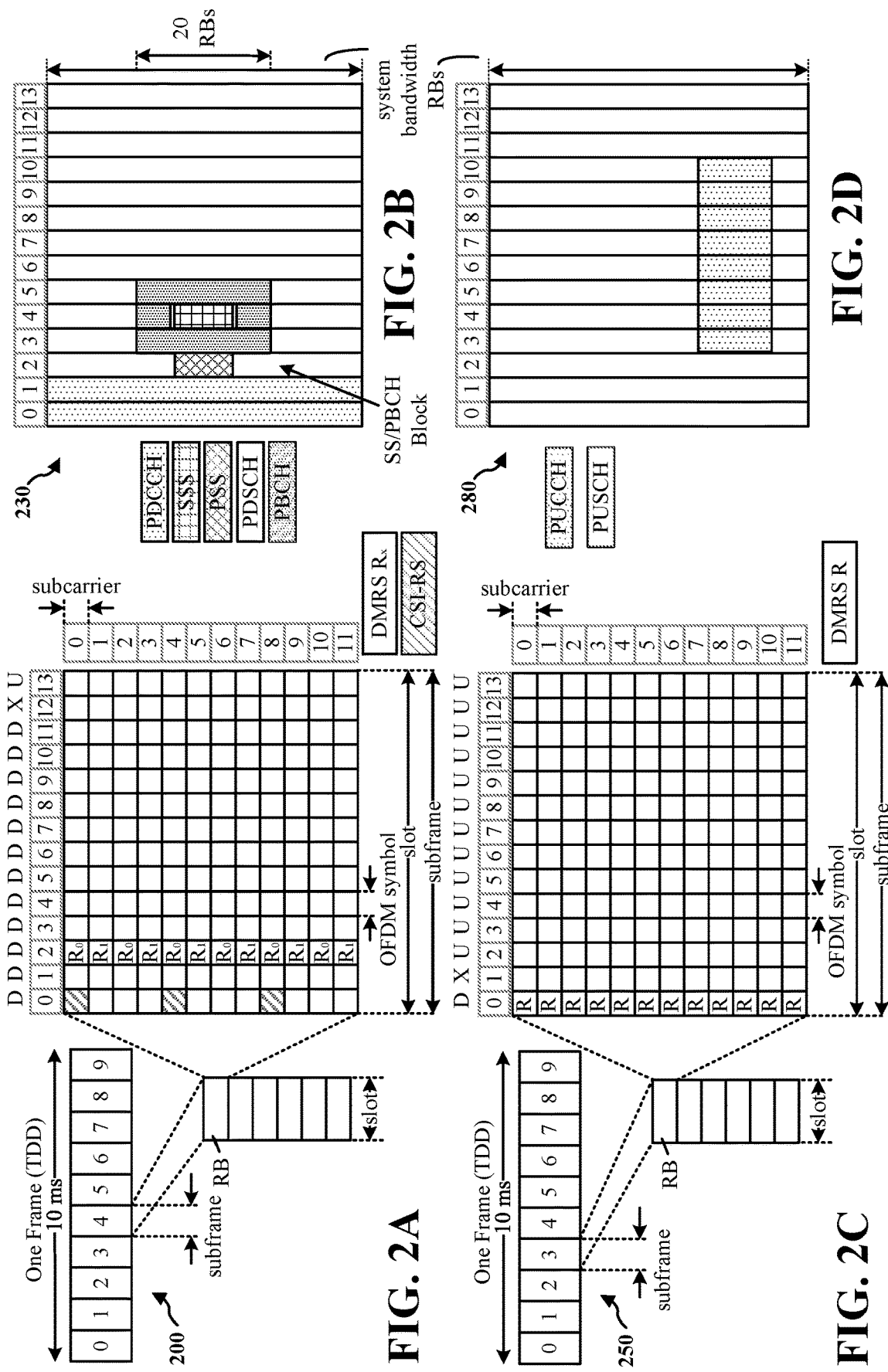
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
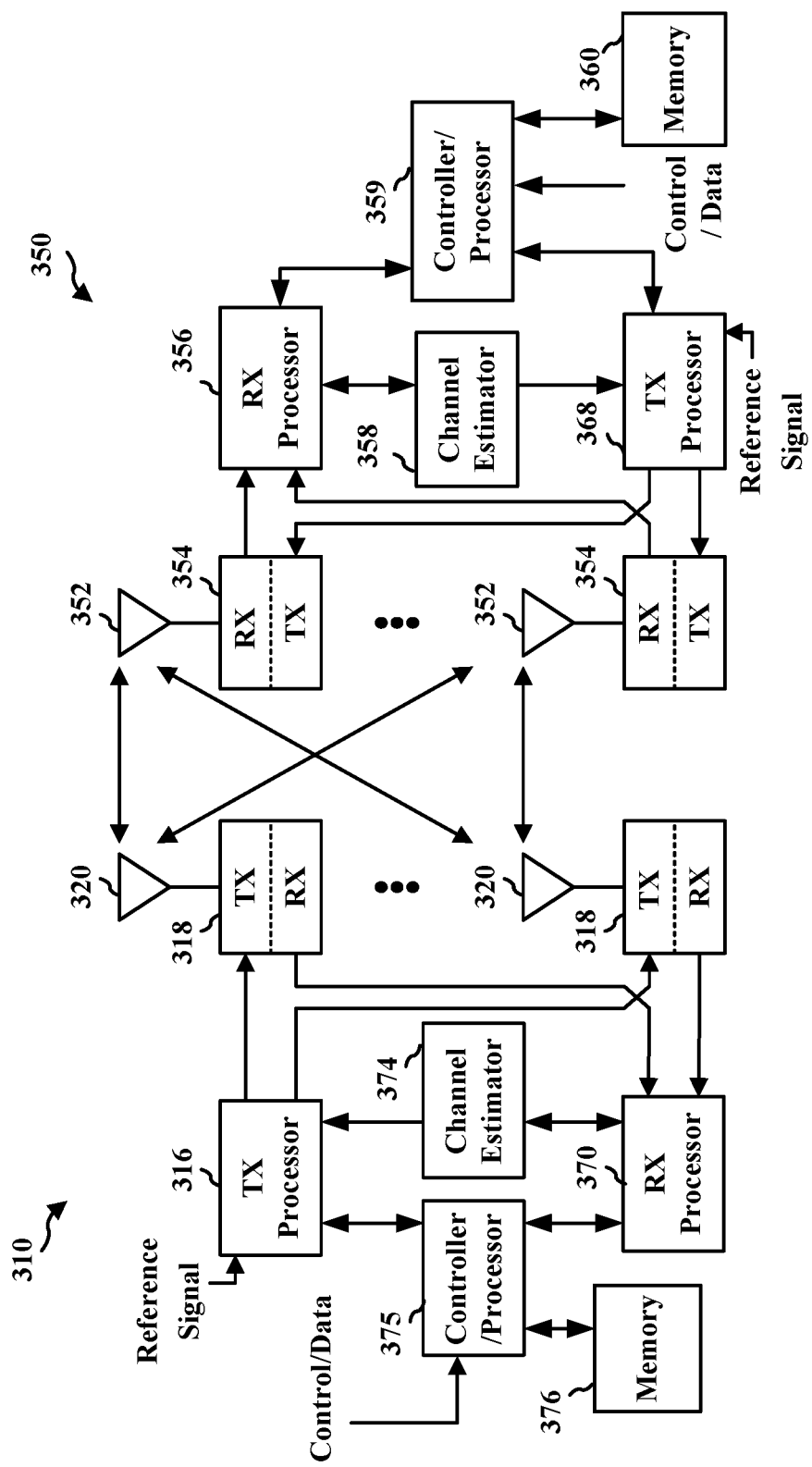
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

Figure 4:
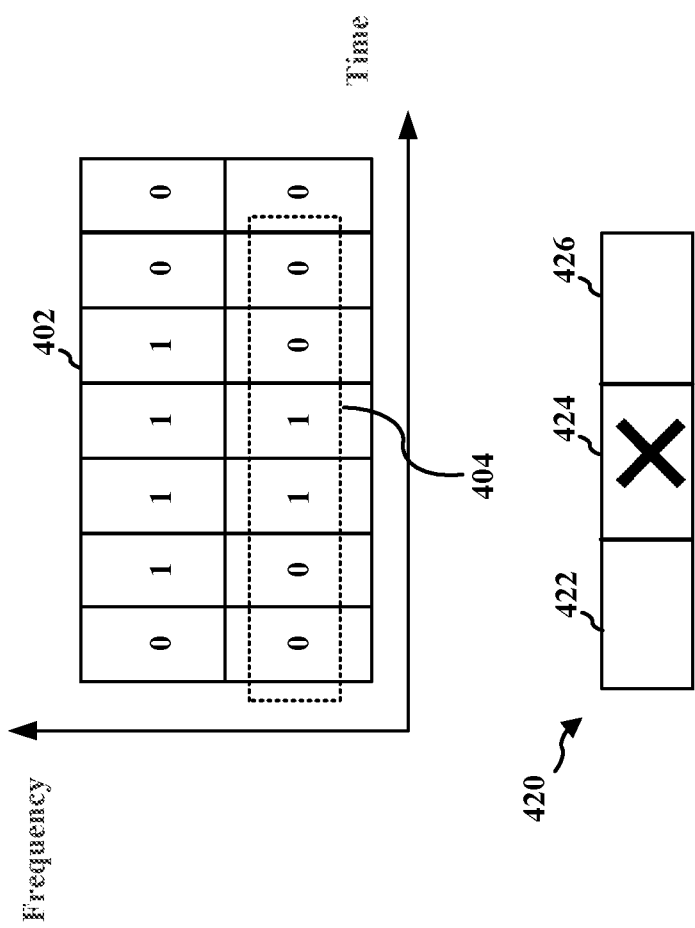
FIG. 4 illustrates an uplink cancellation indication (ULCI) procedure that may be used by a mobile communication system to preempt previously allocated resources.

A mobile communication system may support different uplink protocols with different requirements. The uplink data set through some protocols may be prioritized over the uplink data sent through other protocols. For example, a mobile communication system, such as an NR communication system, may support eMBB for high bandwidth, high throughput communication and may support URLLC for high reliability, low latency communication. In order to improve spectrum utilization, the communication system may dynamically multiplex users with different services (such as eMBB and URLLC) in overlapping time-frequency resources. In order to provide low latency, the mobile communication system may need to prioritize URLLC communication over eMBB communication. FIG. 4 illustrates an ULCI procedure that may be used by a mobile communication system to prioritize uplink data on an uplink channel. A ULCI procedure may also be referred to as an uplink pre-emption indication (ULPI) procedure.

A pre-emption indication (PI) may be used by a base station to accommodate URLLC transmissions on resources that were allocated to another transmission, e.g., to eMBB UEs. Where a UE has already been scheduled for uplink data to be transmitted on an uplink channel using allocated resources, the ULCI procedure may be used by the base station to indicate that resources for previously-scheduled uplink data should be replaced with higher-priority uplink data. For example, the base station may use an ULCI to schedule URLLC transmissions on resources that were allocated to eMBB UE(s). The base station may use the ULCI to indicate to the eMBB UE(s) to cancel part of a transmission that overlaps with an urgent URLLC transmission from another user. The ULCI may be transmitted before the affected eMBB transmission. The eMBB UE then cancels the overlapping part of its transmission after receiving the ULCI so that its transmission does not interfere with the URLLC transmission from the other user.

A base station may send a UE a ULCI and a ULCI bitmap 402. The time and frequency resources of an uplink channel can be represented as a grid. For example, time and frequency resources may be divided into X*Y grids in which X corresponds to frequency resources and Y corresponds to time resources. In FIG. 4, X=2 and Y=7. Each cell of the ULCI bitmap 402 may represent one time-frequency resource. Each cell of the ULCI bitmap 402 may be assigned a value which represents whether the corresponding resource of the uplink channel is pre-empted (e.g., a cell is assigned a value 1 if that cell will be pre-empted or a value 0 if that cell will not be pre-empted).

Scheduled uplink data 420 is data which was scheduled for transmission on the uplink channel prior to the ULCI (e.g., eMBB data). The portion 404 of the ULCI bitmap 402 may correspond to the uplink channel resources where the scheduled uplink data 420 was scheduled to transmit. Based on the values in the portion 404 of the ULCI bitmap 402, the middle segment 424 of the scheduled uplink data 420 will be pre-empted (and, e.g., replaced with higher-priority uplink data) and the beginning segment 422 and the end segment 426 may not be pre-empted. The UE scheduled for the eMBB data compares its uplink transmission with the indicated resource in the ULCI and preempts its eMBB transmission, e.g., cancels or stops its eMBB transmission, starting from the first overlapping OFDM symbol. In some aspects, the UE may resume its uplink transmission of scheduled uplink data 420 on resources which are not pre-empted, e.g., may transmit the end portion 426 of the scheduled uplink data 420. The resumption of transmission after stopping in response to the ULCI may be referred to as a "stop with resume." In some aspects, the UE may stop the transmission of the scheduled uplink data 420, e.g., may not transmit the end portion 426 of the scheduled uplink data 420. The cancelation of the remaining transmission in response to the ULCI may be referred to as a "stop without resume."

In some aspects, base station may use ULCI to preempt PUSCH and the PUCCH. In some aspects, the base station may use ULCI to preempt PUSCH but not PUCCH.

Multiplexing may be used to address colliding transmissions that overlap in time. A UE may transmit uplink control transmissions on a PUCCH and may transmit uplink data transmissions on a PUSCH. When the scheduled transmission of two uplink channels collide in time, e.g., overlap at least partially in time, the UE may resolve the collision by multiplexing the content of two uplink channels. Collisions may involve a first PUCCH colliding with a second PUCCH, and the UE may multiplex a UCI payload of the two control channels and transmit them in a single PUCCH. Collisions may involve a PUCCH colliding with a PUSCH, and the UE may multiplex the UCI of the PUCCH with the PUSCH transmission. The multiplexing of the UCI of the PUCCH with the PUSCH transmission may be referred to as piggybacking the UCI on the PUSCH transmission.

Figure 5:
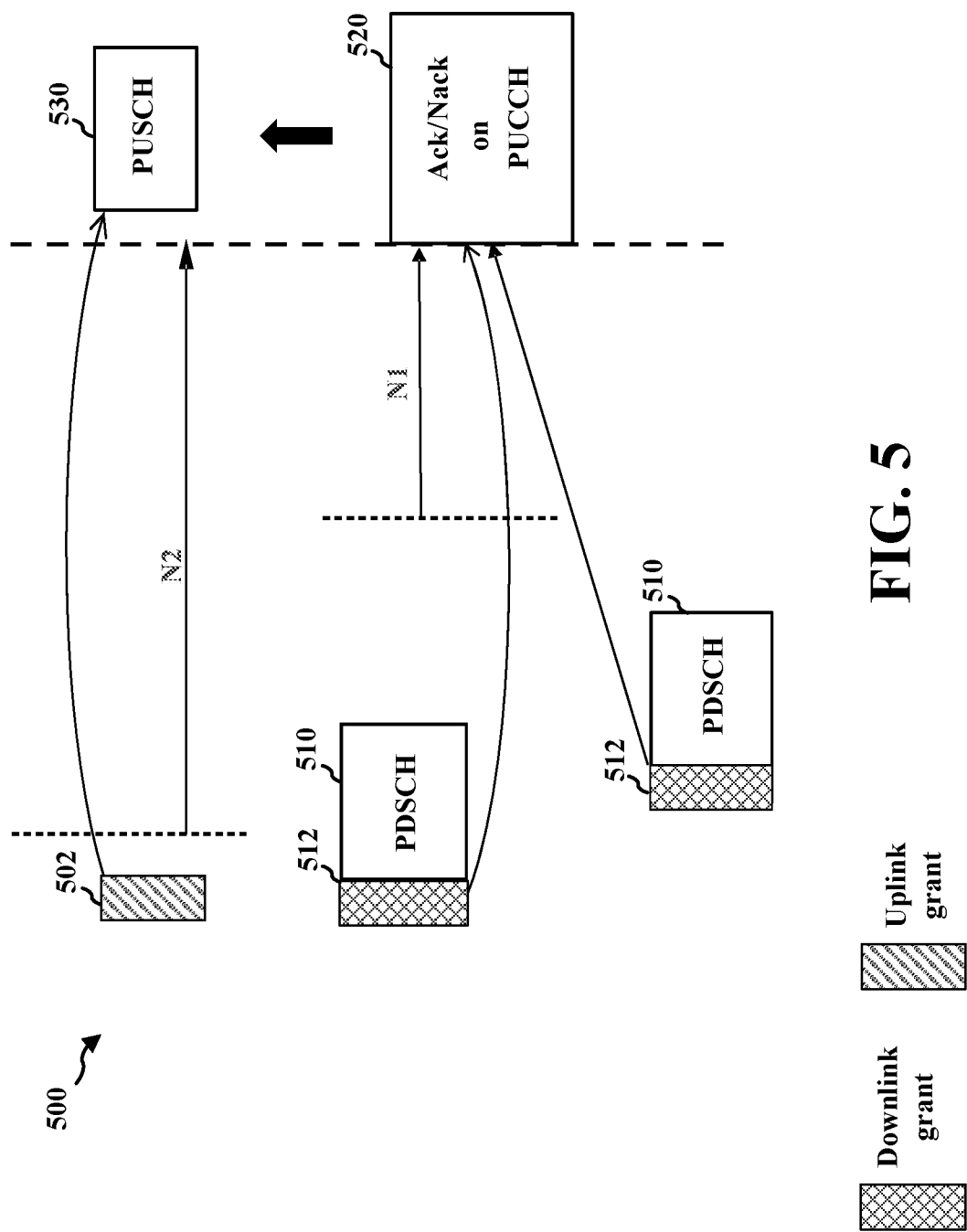
FIG. 5 shows example aspects of UCI multiplexing for addressing a collision of multiple uplink transmissions.

An example of an uplink collision is depicted in FIG. 5. FIG. 5 shows example aspects of UCI multiplexing 500 for addressing a collision of multiple uplink transmissions. In FIG. 5, HARQ-ACK feedback (e.g., Ack/Nack) that will be sent as UCI on a PUCCH collides with a PUSCH transmission. As illustrated in FIG. 5, an uplink collision occurs because the PUSCH 530 and the PUCCH 520 would overlap in time. When an uplink collision occurs, a UE may resolve the collision by multiplexing the content of the two transmissions.

In FIG. 5, UE has received an UL grant 502 from a base station allocating resources for the PUSCH transmission 530. The UE has also received downlink communication(s) 510. For example, the UE may receive downlink grants 512 and corresponding PDSCH 510 from the base station. In response to receiving the DL grants 512 and PDSCH 510, the UE may determine to provide HARQ-ACK feedback in a PUCCH transmission 520 to the base station. The PUCCH transmission 520 may be scheduled to be transmitted during a time partially overlapping with the time scheduled for transmitting the PUSCH 530. Accordingly, an uplink collision may occur between the PUSCH transmission 530 and the HARQ-ACK feedback in the PUCCH transmission 520.

The UE may resolve the uplink collision by multiplexing the UCI of the PUCCH transmission 520, e.g., the HARQ-ACK feedback, with the PUSCH transmission 530 (e.g., piggybacking the HARQ-ACK feedback on the PUSCH). Certain timeline conditions may need to be met for the UE to use multiplexing to resolve the collision. In some aspects, the UE may multiplex the UCI of the PUCCH transmission 520 with the PUSCH transmission 530 when the UL grant 502 is received at least N2 symbols earlier than the earliest symbol of the PUSCH transmission 530 and the earliest symbol of the PUCCH transmission 520, N2 being an integer number. Additionally or alternatively, the UE may multiplex the UCI of the PUCCH transmission 520 with the PUSCH transmission 530 when the last symbol of the PDSCH transmission(s) 510 is received at least N1 symbols prior to the earliest symbol of the PUSCH transmission 530 and the earliest symbol of the PUCCH transmission 520, N1 being an integer number. When these timeline conditions are met, the UE may multiplex the UCI of the PUCCH transmission 520, e.g., the HARQ-ACK feedback, with the data of the PUSCH transmission 530 and may transmit both on a single PUSCH. In some aspects, if the timeline conditions are not satisfied, the UE may determine an error case and may determine not to multiplex the two transmissions.

In some aspects, an uplink collision may occur between two uplink channels for a UE and a ULCI may be received indicating that the UE should pre-empt portions of one or more of the colliding channels. The order in which the ULCI and the multiplexing is applied can yield different outcomes. For example, when a PUCCH and a PUSCH collide, the UCI of the PUCCH may be multiplexed onto the PUSCH, as described in connection with FIG. 5. If the UE performs the multiplexing prior to applying the ULCI to the PUSCH, the UCI which is multiplexed onto the PUSCH may not be communicated to the base station due to the preemption of the PUSCH. The symbols containing the UCI may be pre-empted, or the UCI information may be dropped with the rest of the PUSCH, e.g., if the UE is using a stop without resume mode. Alternatively, if the UE applies the ULCI before the multiplexing, the UE may not transmit the PUSCH, but may still transmit the PUCCH. The UE may preempt the PUSCH based on the ULCI. As the PUSCH is preempted or canceled, the collision between the PUSCH and the ULCI may be avoided, and the PUCCH may be transmitted by the UE.

Figure 6:
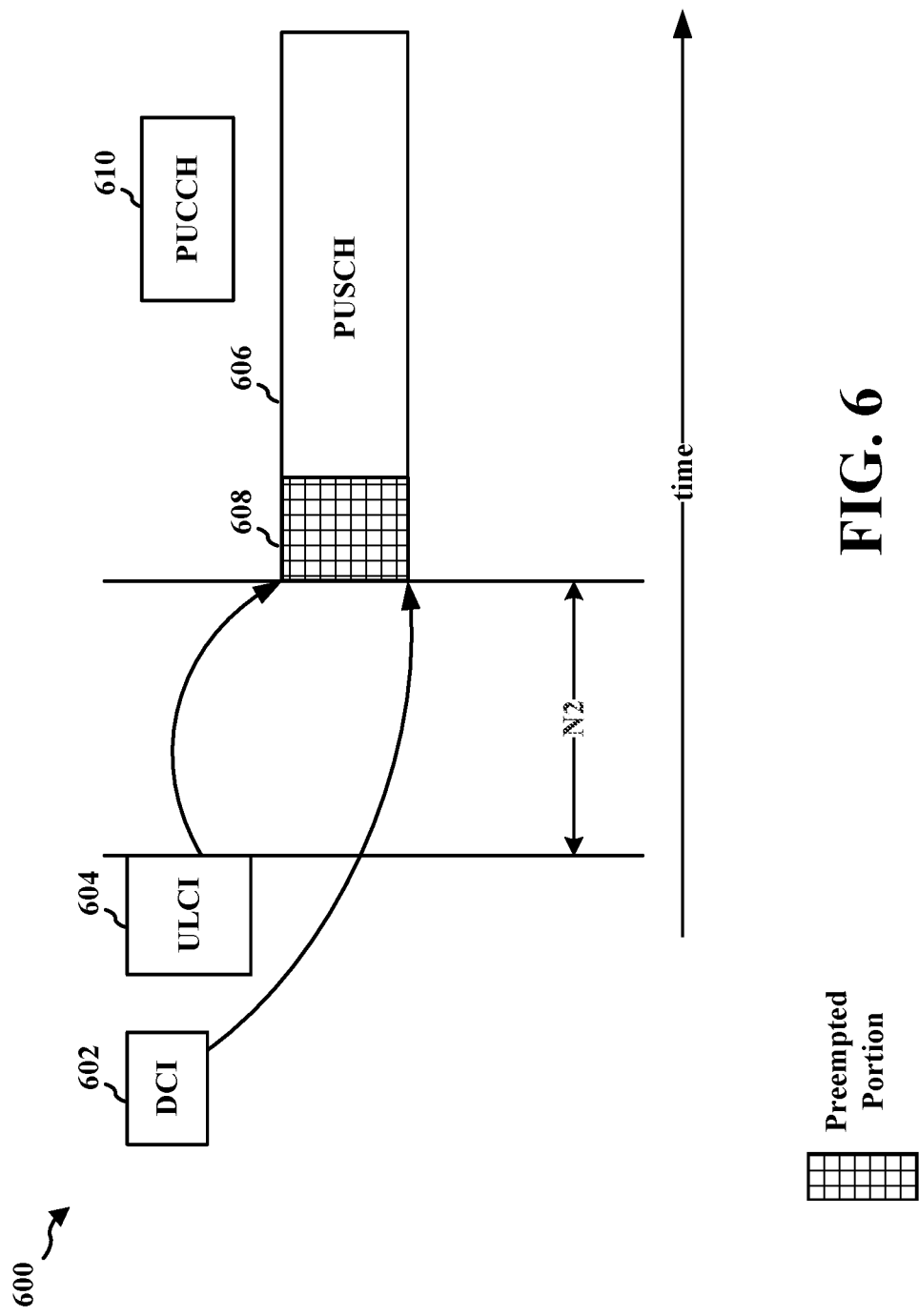
FIG. 6 illustrates an example of resolving an uplink collision when a ULCI has been received.

FIG. 6 illustrates a diagram 600 illustrating an example of resolving an uplink collision where a ULCI has been received. The UE receives DCI 602 from a base station that may schedule the UE to transmit the PUSCH 606. The UE has an uplink collision between the PUSCH 606 and the PUCCH 610. The PUCCH may include Ack/Nack feedback for a PDSCH transmission that the UE received from the base station. The UE also receives a ULCI 604 from the base station. The ULCI indicates that the resources of the PUSCH at pre-empted portion 608 are pre-empted. The ULCI 604 and the DCI 602 may be received N2 or more symbols before the PUSCH 606 and/or the PUCCH 610 are scheduled to be transmitted. The ULCI 604 may be received before the UE has made multiplexing decisions for resolving the uplink collision.

The UE may apply a multiplexing rule for multiplexing the UCI of the PUCCH 610 onto the PUSCH 606 to resolve the uplink collision prior to taking any action in response to the ULCI 604. For example, the UE may apply the multiplexing rule to the PUCCH 610 and the PUSCH 606 regardless of when the ULCI 604 was received. The ULCI 604 would not impact the decision to multiplex the PUCCH 610 onto the PUSCH 606 or the application of the multiplexing rule. After the multiplexing decision is made and the UCI of the PUCCH 610 is multiplexed onto the PUSCH 606, the UE may puncture some of the symbols of the PUSCH 606 transmission, e.g., the resources in the pre-empted portion 608, and will therefore not transmit the PUSCH 606 during the pre-empted portion 608. In some aspects, the UE may resume transmitting the PUSCH 606 after the pre-empted portion 608. In some aspects, the UE may not resume transmitting the PUSCH 606, and may cancel or delay transmission of the PUSCH 606 altogether. If the UCI is multiplexed onto resources scheduled to be transmitted in the pre-empted portion 608 or in another portion of the PUSCH 606 that is not transmitted (e.g., stop-without-resume), then the UCI will not be transmitted to the base station. The UCI will be treated as part of the PUSCH after the multiplexing, and therefore will be dropped when the UE drops the symbols of the PUSCH transmission. If the UE applies the ULCI before applying a multiplexing rule, the UE may drop some of the symbols of the PUSCH transmission. The UE may still transmit the PUCCH, as it is not treated as part of the PUSCH transmission prior to the multiplexing. For example, as illustrated in FIG. 6, if the UE utilizes stop-without-resume, the UE may cancel transmission of the resources of the PUSCH 606 in the pre-empted portion 608 and may also cancel transmission of the subsequent resources of the PUSCH 606. As the resources of the PUSCH 606 which would have overlapped with the PUCCH 610 in time are no longer scheduled to be transmitted, the UE may not apply a multiplexing rule with respect to the PUSCH 606 and the PUCCH 610, and may transmit the PUCCH 610 as scheduled.

In some aspects, a UE may apply a multiplexing rule and an ULCI a particular order whenever the UE is to apply both a multiplexing rule and an ULCI. For example, the UE may apply the multiplexing rule first and may apply the ULCI on the resulting multiplexed channel. In this example, it may not matter how early a ULCI is received, the UE may apply the ULCI after the multiplexing decision is made. Thus, in FIG. 6, the UE may multiplex the UCI for the PUCCH 610 transmission with the PUSCH 606 transmission and may then apply ULCI 604 to the resulting, multiplexed PUSCH 606 transmission.

Figure 7:
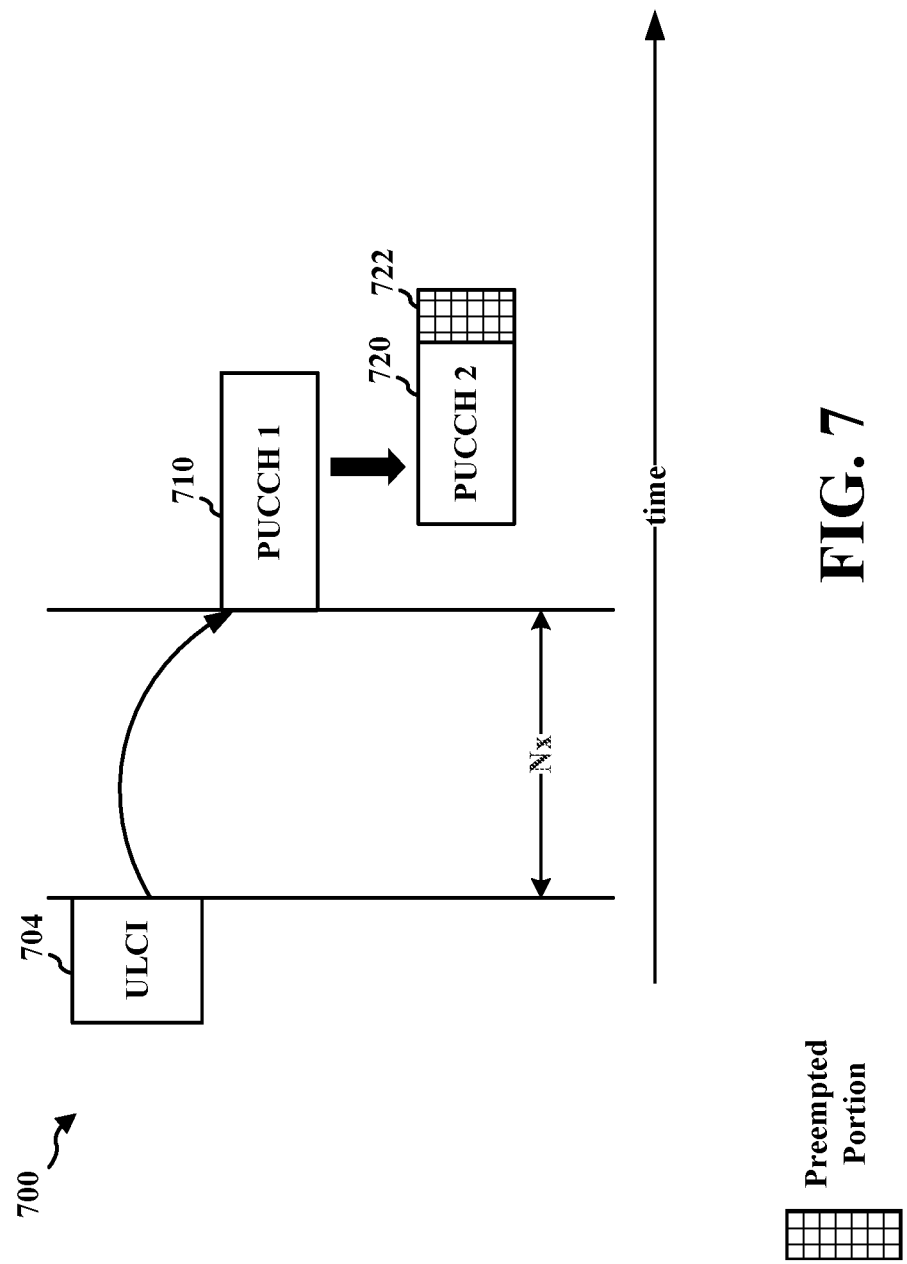
FIG. 7 illustrates an example of resolving an uplink collision when a ULCI has been received.

FIG. 7 illustrates another method 700 of resolving an uplink collision where a ULCI has been received. In some aspects, UCI information from a PUCCH can be multiplexed on another PUCCH, and a ULCI can pre-empt a PUCCH. FIG. 7 illustrates an uplink collision between a first PUCCH 710 and a second PUCCH 720 because at least a portion of the PUCCH transmissions overlap in time. The UE receives a ULCI 704 from a base station indicating that the symbols at the pre-empted portion 722 are pre-empted for the second PUCCH 720. If a UE applies the multiplexing rule prior to applying the ULCI, the UE would first multiplex the UCI content of the first PUCCH 710 and the second PUCCH 720 on a determined PUCCH channel. The UE may then apply the ULCI on the determined PUCCH channel.

UCI may be lost, as the UE may not put the UCI back in the PUCCH transmission after the UCI from the PUCCH transmission has been multiplexed with the other uplink transmission (e.g., the PUSCH in FIG. 6 or the determined PUCCH in FIG. 7.

The UE applies a multiplexing rule for multiplexing the UCI of the first PUCCH 710 onto the second PUCCH 720 to resolve the uplink collision prior to taking any action in response to the ULCI 704. The ULCI 704 will not impact the decision to multiplex the first PUCCH 710 onto the second PUCCH 720 or the application of the multiplexing rule. After the multiplexing decision is made and the UCI of the first PUCCH 710 is multiplexed onto the second PUCCH 720, the UE will pre-empt the resources in the pre-empted portion 722 and will therefore not transmit the second PUCCH 720 during the pre-empted portion 722. If the UCI of the first PUCCH 710 is multiplexed onto the pre-empted portion 722 or if the UE does not transmit the second PUCCH 720 because of the ULCI 704, then the UCI will not be transmitted to the base station.

Alternatively, in some aspects, the UE may apply a multiplexing rule for multiplexing the UCI of the first PUCCH 710 and the UCI of the second PUCCH 720 onto a new PUCCH. The UE may, as described above, apply the multiplexing rule prior to applying pre-emption to the new PUCCH in response to the ULCI 704.

Figure 8:
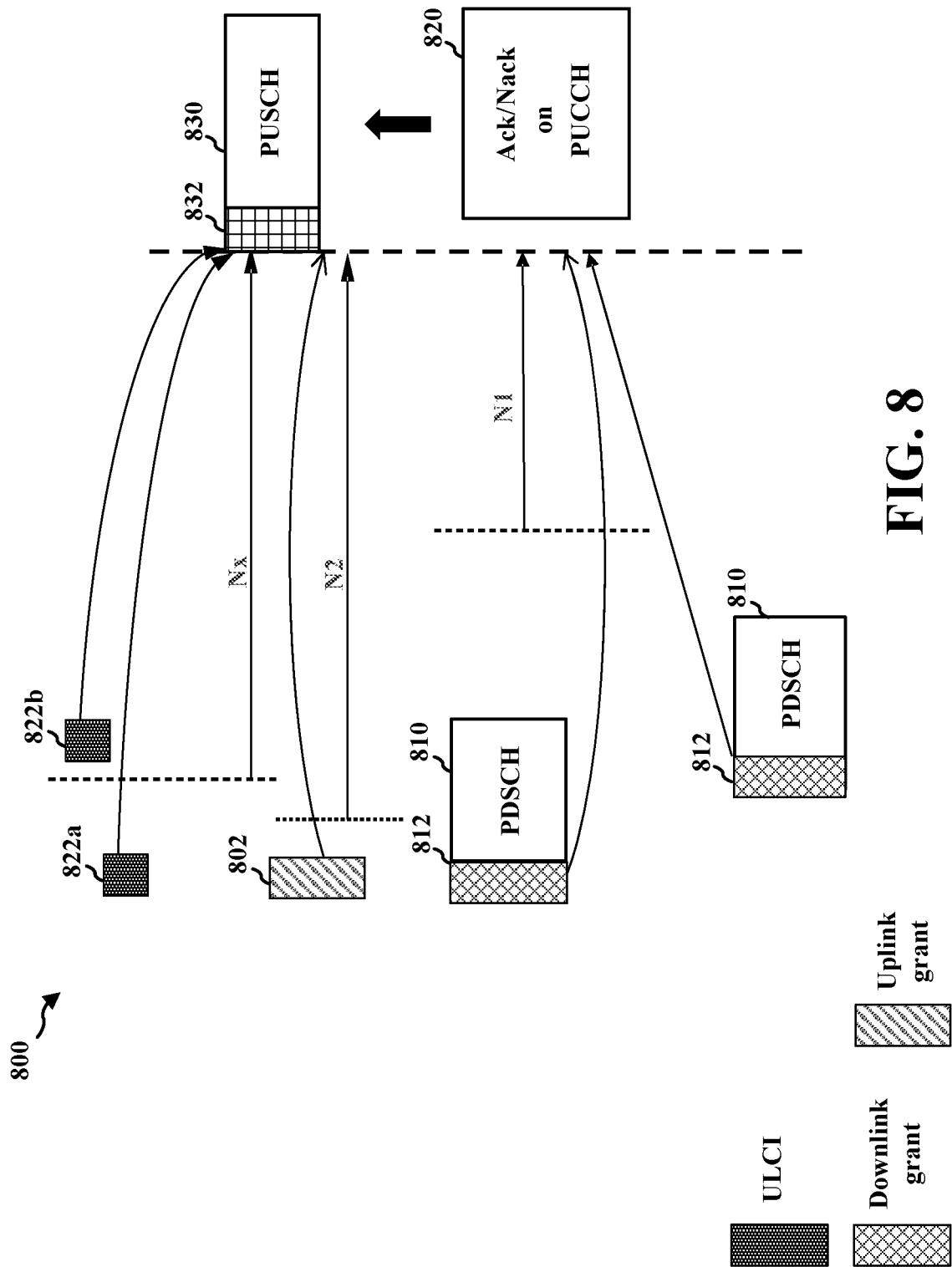
FIG. 8 illustrates an example of resolving an uplink collision when a ULCI has been received.

FIG. 8 illustrates another diagram 800 showing example aspects for resolving an uplink collision where a ULCI has been received. FIG. 8 illustrates an UL grant 802 from a base station allocating resources for PUSCH transmission 830. The UE has also received downlink communication(s) 810. For example, the UE may receive downlink grants 812 and corresponding PDSCHs 810 from the base station. Based on the DL grants 812, the UE may provide HARQ-ACK feedback for the PDSCH 810 in a PUCCH transmission 820 to the base station. FIG. 8 illustrates an uplink collision that may occur between the PUSCH transmission 830 and the HARQ-ACK feedback in the PUCCH transmission 820, due to an overlap in time between the PUSCH transmission 830 and the PUCCH transmission 820.

The UE may also receive a ULCI 822a or 822b from the base station indicating that symbols scheduled for transmission in the pre-empted portion 832 of the PUSCH transmission 830 are pre-empted. ULCI 822a is shown as being received at least Nx symbols before the earliest starting symbol of the PUCCH 820 and the PUSCH 830 is scheduled to be transmitted. Nx is applied with respect to the earliest starting symbol of the PUCCH 820 or the PUSCH 830, e.g., depending on which transmission is scheduled to start first. ULCI 822b is shown as being received less than Nx symbols before the earliest starting symbol of the PUCCH 820 and the PUSCH 830 is scheduled to be transmitted. In some aspects, Nx may be a threshold number of symbols prior to transmission of the earliest starting symbol of the PUCCH 820 and the PUSCH 830 that the UE uses to determine the order of applying the multiplexing rule to the PUSCH transmission 830 and the PUCCH transmission 820 and applying the ULCI 822a or 822b to the PUSCH transmission 830. For example, the UE may apply the ULCI prior to the multiplexing rule when the ULCI is received more than Nx symbols prior to the earliest starting symbol of the PUCCH 820 and the PUSCH transmission 830 (e.g., for ULCI 822a), the UE may apply the ULCI prior to the multiplexing. If the ULCI is received less than Nx symbols prior to the earliest starting symbol of the PUCCH 820 and the PUSCH transmission 830 (e.g., for ULCI 822b), the UE may apply the multiplexing rule before applying the ULCI.

In some aspects, the value of Nx may be based on whether one of the uplink channels in the uplink collision is a PUSCH transmission. If one of the uplink channels is a PUSCH transmission then Nx may be based on N2 (e.g., may be equal to N2), and if neither of the uplink channels is a PUSCH transmission (e.g., the PUCCH 820 is colliding with another PUCCH) then Nx may be based on N1 (e.g., may be equal to N1). N2 may be a threshold for the number of symbols between the UL grant 802 and the scheduled PUSCH transmission 830 in order to multiplex the UCI of the PUCCH 820 with the PUSCH transmission 830. N1 may be a threshold for the number of symbols between the end of a PDSCH transmission and the beginning of a PUCCH transmission in order to multiplex the UCI of a PUCCH transmission with another uplink transmission. N2 may be based on the processing capability of the uplink carrier on which the PUSCH 830 is transmitted (e.g., whether the carrier is configured with a processing capability 1 or configured with a processing capability 2). N1 may be configured based on the processing capability of a PDSCH 810 received, as the resulting PUCCH may carry the HARQ-ACK for the PDSCH 810. In some aspects, Nx may be based on N2 (e.g., equal to N2) regardless of whether the uplink channels include a PUSCH transmission.

In some aspects, Nx may be based on a subcarrier spacing. For example, when the PUCCH, the PDCCH carrying the ULCI, and/or the PUSCH have a different subcarrier spacing, the UE may use a particular Nx (e.g., may follow a minimum timeline to obtain Nx or may follow a maximum timeline to obtain Nx).

The UE may determine whether to apply the UCI multiplexing rule, multiplexing the PUCCH HARQ-ACK feedback 820 onto the PUSCH transmission 830, before or after resolving the pre-emption based on whether the ULCI received is a ULCI 822a received at least Nx symbols before transmission of the PUSCH 830 or a ULCI 822b received less than Nx symbols before transmission of the PUSCH 830.

If the UE receives the ULCI 822a, the UE may apply the ULCI pre-emption to the PUSCH 830 first, then the UE may multiplex the UCI HARQ-ACK feedback 820 onto the PUSCH 830 while accounting for the pre-empted portion 832. In some aspects, the UE may multiplex the HARQ-ACK feedback 820 onto portions of the PUSCH 830 other than the pre-empted portion 832 that were not pre-empted by the ULCI 822a. In some aspects, the UE may determine to delay or cancel transmission of the PUSCH transmission 830 and the UE may transmit the HARQ-ACK feedback 820 on resources previously scheduled for the PUCCH 820. For example, the UE may cancel transmission of some or all of the PUSCH 830, resolving the conflict between the PUSCH 830 and the HARQ-ACK feedback 820, and the UE may therefore transmit the HARQ-ACK feedback 820 on the resources originally scheduled for the HARQ-ACK feedback 820. Because the UE may determine what to do with the HARQ-ACK feedback 820 after applying the ULCI pre-emption, the HARQ-ACK feedback 820 may be transmitted to the base station regardless of the pre-emption of the PUSCH transmission 830.

If the UE receives the ULCI 822b, the UE multiplexes the HARQ-ACK feedback 820 onto the PUSCH 830 first, then the UE applies the ULCI pre-emption to the PUSCH transmission 830. If the HARQ-ACK feedback 820 is multiplexed onto the pre-empted portion 832 or if the UE does not transmit the PUSCH 830 because of the ULCI 822b, then the HARQ-ACK feedback 820 will not be transmitted to the base station.

Figure 9:
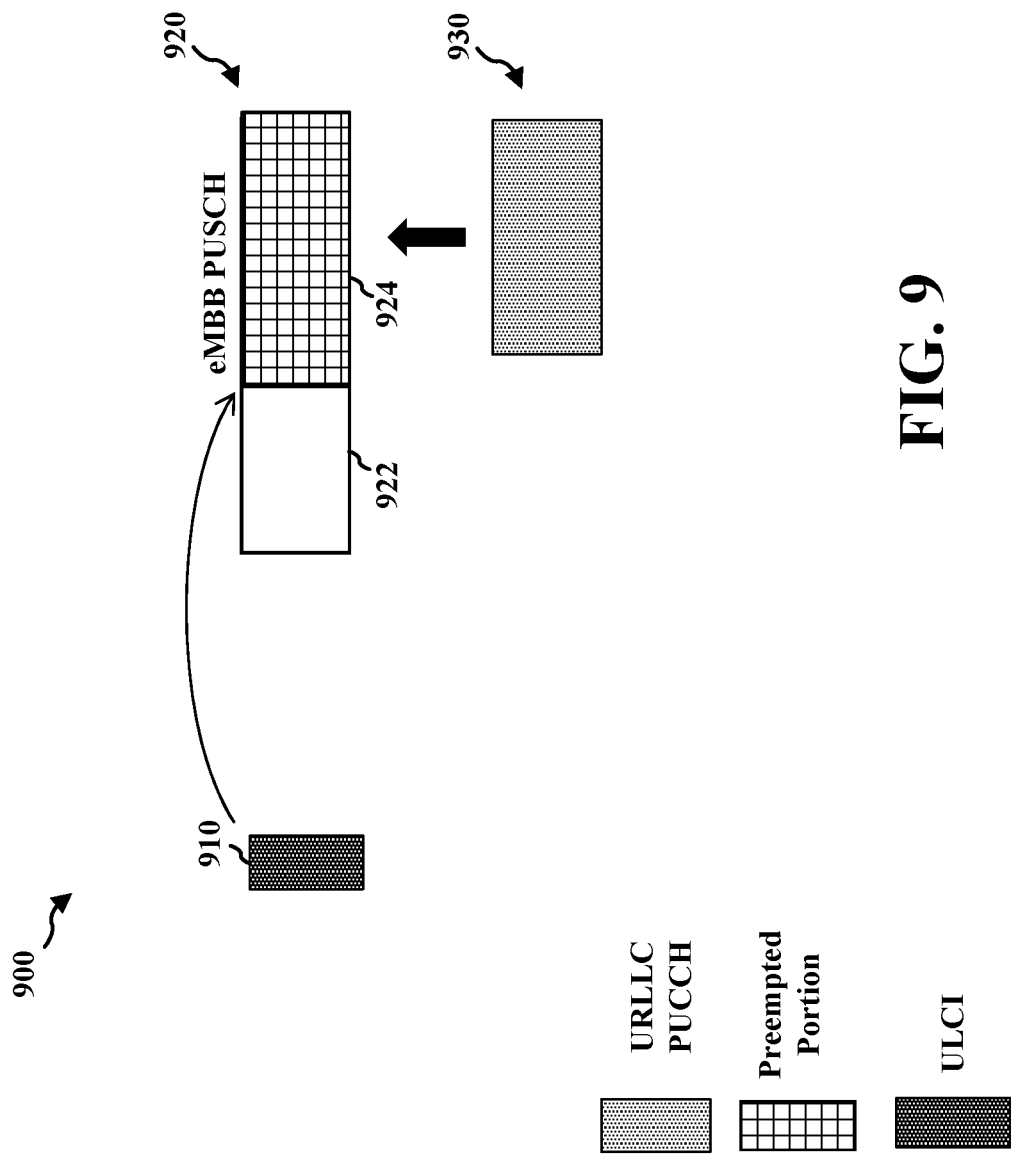
FIG. 9 illustrates an example of resolving a collision when a ULCI has been received.

In some aspects, the UE may base the order of applying the ULCI and the multiplexing rule based on a priority of a channel. ULPI may apply to low priority channels, such as eMBB PUSCH. If the UE is multiplexing a high priority channel and a low priority channel(s), the UE may first apply the ULPI on the low priority channel(s) and then may resolve the collision between any remaining low priority channels and the high priority channel. FIG. 9 illustrates another diagram 900 illustrating aspects of resolving an uplink collision where a ULCI has been received. The UE may be scheduled to transmit a low priority uplink channel 920 to the base station and to transmit a high priority uplink channel 930 to the base station. For example, the low priority uplink channel 920 may be an eMBB PUSCH and the high priority uplink channel 930 may be a URLLC PUCCH. There is an uplink collision (e.g., at least a partial overlap in time) between the low priority uplink channel 920 and the high priority uplink channel 930. The UE receives a ULCI 910 pre-empting the pre-empted portion 924 of the low priority uplink channel 920.

The UE may determine the order to resolve the collision and to apply the ULCI pre-emption based on the priority of the channels. Specifically, where a collision is between a low priority channel and a high priority channel, the UE may apply the ULCI pre-emption to the low priority channel first to avoid interrupting transmission of the data of the high priority channel.

For example, as depicted in FIG. 9, the UE may apply the ULCI pre-emption to the low priority uplink channel 920 first, then apply a UCI multiplexing rule to multiplex the data of the high priority uplink channel 930 with the remaining, non-pre-empted portions of the low priority uplink channel 920. Accordingly, the data of the high priority uplink channel 930 may be transmitted to the base station. As the pre-empted portion 924 of the low priority uplink channel 920 is canceled, the collision between the low priority uplink channel 920 and the high priority uplink channel 930 is resolved, and the UE will transmit the high priority uplink channel 930 to the base station without multiplexing.

Figure 10:
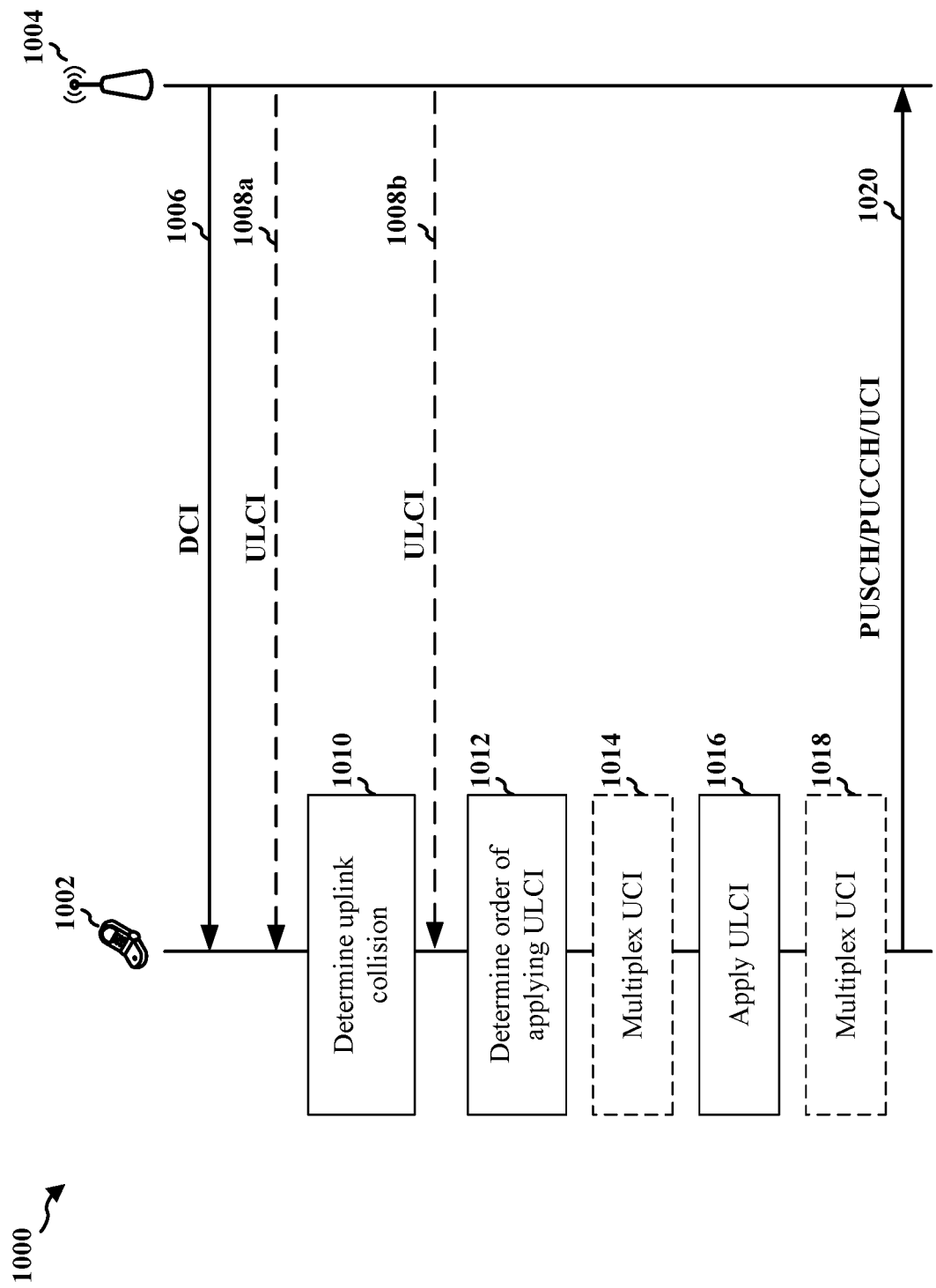
FIG. 10 illustrates an example communication flow between a UE and a base station.

FIG. 10 is a communication diagram showing communication between a UE 1002 and a base station 1004. The base station 1004 may send DCI information to the UE 1002, scheduling the UE 1002 for uplink transmission(s) during an uplink period. The base station 1004 may also send a ULCI 1008a, 1008b to the UE 1002 which may identify a pre-empted portion of the uplink period scheduled by the DCI 1006, during which the UE 1002 may not transmit its previously-scheduled uplink transmission. The base station 1004 may send the ULCI 1008a before the UE identifies a collision at 1010, or may send the ULCI 100b after the UE identifies a collision at 1010.

At 1010, the UE 1002 may determine that there is an uplink collision between the uplink channel scheduled in response to the DCI 1006 and another uplink channel scheduled to be transmitted by the UE at the same time.

At 1012, the UE 1002 may determine an order for applying the ULCI and resolving the uplink collision. In some aspects, as discussed supra with respect to FIGS. 6 and 7, the UE 1002 may always determine to resolve the uplink collision via UCI multiplexing before applying ULCI pre-emption. In some aspects, as discussed supra with respect to FIG. 8, the UE 1002 may determine to apply ULCI pre-emption before resolving the uplink collision if the UE received the ULCI 1008a prior to 1010, and the UE 1002 may determine to resolve the uplink collision prior to applying ULCI pre-emption if the UE received the ULCI 1008b after 1010. In some aspects, as discussed supra with respect to FIG. 9, the UE 1002 may determine the order for applying the ULCI and resolving the uplink collision based on the priority of the uplink channels.

At 1014, if the UE 1002 determined to resolve the uplink collision first at 1012, the UE may apply a UCI multiplexing rule to incorporate UCI of one of the colliding uplink channels onto the other colliding uplink channel.

At 1016, the UE 1002 applies ULCI pre-emption. If the UE 1002 applied the multiplexing rule to the uplink channels at 1014, then the UE 1002 applies the ULCI pre-emption to the resultant multiplexed uplink channel. If the UE 1002 did not apply the multiplexing rule at 1014, then the UE 1002 applies the ULCI pre-emption to one of the two colliding uplink channels.

At 1018, if the UE 1002 determined to apply the ULCI first at 1012, the UE 1002 may apply a UCI multiplexing rule to incorporate UCI of one of the colliding uplink channels onto the uplink channel pre-empted at 1016.

Finally, the UE 1002 may send the resultant transmission 1020 to the base station 1004.

Figure 11:
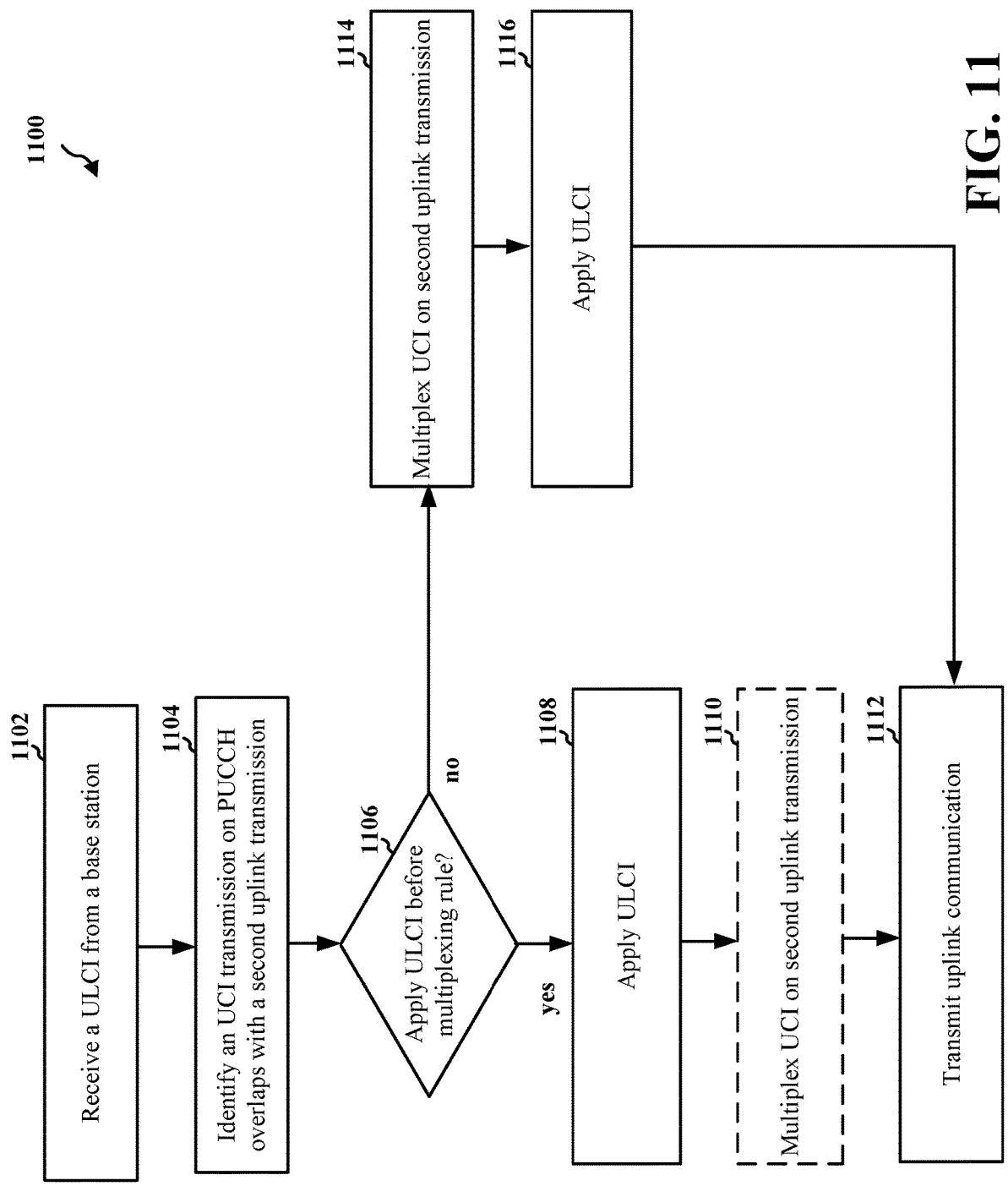
FIG. 11 is a flowchart of a method of wireless communication.

FIG. 11 is a flowchart 1100 of a method of wireless communication. The method may be performed by a UE or a component of a UE (e.g., the UE 104, 350; the apparatus 1202/1202'; the processing system 1314, which may include the memory 360 and which may be the entire UE 350 or a component of the UE 350, such as the TX processor 368, the RX processor 356, and/or the controller/processor 359). The method may help a UE to determine an order in which to apply an ULCI and multiplexing based on overlapping uplink transmissions from the UE.

At 1102, the UE receives an ULCI from a base station. The ULCI may indicate to the UE to cancel or preempt at least a portion of previously allocated resources in order to avoid interference with another uplink transmission, e.g., for another user. The ULCI may be received, e.g., by the reception component 1204 of the apparatus 1202.

At 1104, the UE identifies that a UCI transmission on a PUCCH transmission overlaps with a second uplink transmission. The identification may be performed, e.g., by the overlap component 1208 of the apparatus 1202. The second uplink transmission may comprise an eMBB transmission. The UE may apply a multiplexing rule based on the overlap between the two transmissions. The second uplink transmission may be a PUSCH transmission, and the multiplexing rule may be for multiplexing the UCI with the PUSCH transmission. For example, FIG. 5 illustrates an example of multiplexing UCI with a PUSCH transmission. The second uplink transmission may be a second PUCCH transmission, and the multiplexing rule may be for multiplexing the UCI with the second PUCCH transmission. FIG. 7 illustrates an example of multiplexing UCI from one PUCCH with another PUCCH.

In some aspects, at 1106, the UE determines whether to apply the ULCI to the PUCCH transmission and the second uplink transmission before applying a multiplexing rule for multiplexing the UCI with the second uplink transmission. The determination may be performed, e.g., by the determination component 1210 of the apparatus 1202. As an example, the UE may determine to apply the ULCI after applying the multiplexing rule. For example, when a UE receives ULCI, the UE may determine to apply the ULCI after applying the multiplexing rule. The order of applying ULCI and multiplexing may be based on a fixed order, e.g., regardless of when the ULCI is received. Then, at 1114, the UE may multiplex the UCI on the second uplink transmission. For example, the UE may apply the multiplexing rule. At 1116, the UE may apply the ULCI to the multiplexed transmission. The multiplexing rule may be applied, e.g., by the multiplex component 1212 of the apparatus 1202. The ULCI may be applied, e.g., by the ULCI component 1214 of the apparatus 1202.

As another example, the UE may determine whether to apply the ULCI before applying the multiplexing rule based on an amount of time from receipt of the ULCI to a first symbol of the PUCCH transmission or of the second uplink transmission (e.g., based on which of the PUCCH transmission or the second uplink transmission has an earlier starting symbol). For example, the UE may determine whether to apply the ULCI before applying the multiplexing rule based on an amount of time from receipt of the ULCI to the earliest of a first symbol of the PUCCH transmission or a first symbol of the second uplink transmission. The UE may apply the ULCI after the multiplexing rule, e.g., at 1114 and 1116, when the ULCI is received less than a threshold number of symbols prior to the first symbol of the PUCCH transmission or of the second uplink transmission (e.g., based on which of the PUCCH transmission or the second uplink transmission has an earlier starting symbol). For example, the UE may apply the ULCI after the multiplexing rule, e.g., at 1114 and 1116, when the ULCI is received less than a threshold number of symbols prior to the earliest of the first symbol of the PUCCH transmission or the first symbol of the second uplink transmission. The UE may apply the ULCI prior to the multiplexing rule when the ULCI is received a threshold number of symbols prior to the first symbol of the PUCCH transmission or the second uplink transmission. Thus, the UE may apply the ULCI, at 1108. Then, after applying the ULCI, the UE may multiplex the UCI on the second uplink transmission, at 1110. For example, the UE may apply the multiplexing rule. The multiplexing, at 1110, is shown with a dashed line, because the application of the ULCI, at 1108, may lead to a cancelation of the portion of the second uplink transmission that overlaps the PUCCH. Therefore, the UCI of the PUCCH transmission may be transmitted on the PUCCH without being multiplexed with the second uplink transmission. The UE may use different thresholds at different times. For example, the UE may use a first threshold number of symbols (e.g., N2 from the multiplexing rule) for the determination at 1106 when at least one of the multiplexing rule or the ULCI is applied to a PUSCH. When the multiplexing rule or the ULCI do not apply to a PUSCH, the UE may use a second threshold number of symbols (e.g., N1 from the multiplexing rule) for the determination at 1106.

The threshold number of symbols may be based on a processing capability of the UE. For example, the processing capability may be a processing capability of the corresponding carrier on which the second uplink transmission is transmitted. As an example, N1 may be determined based on the processing capability of a PDSCH, such as when the UE is multiplexing Ack/Nack feedback for the PDSCH with the second uplink transmission. As another example, N2 may be based on a processing capability of the corresponding carrier of a PUSCH that is the second uplink transmission.

The threshold number of symbols may be based on a threshold for the multiplexing rule. For example, the threshold number of symbols may be based on N1 or N2 from the multiplexing rule.

The threshold number of symbols may be based on a subcarrier spacing of at least one of the PUCCH transmission, the second uplink transmission or a downlink control channel. As an example, the threshold number of symbols may be a certain value when the PUCCH transmission, the second uplink transmission and/or a PDSCH that is involved has a different subcarrier spacing.

The UE may determine whether to apply the ULCI before applying the multiplexing rule based on a priority of a channel. For example, when a first channel has a lower priority than a second channel, the UE may the ULCI on a first channel before applying the multiplexing rule (e.g., at 1108 and 1110) to resolve a collision between the first channel and a second channel. FIG. 9 illustrates an example involving a priority of a channel.

At 1112, the UE transmits uplink communication to the base station based on the determination of whether to apply the ULCI before applying the multiplexing rule. The uplink communication may be transmitted, e.g., by the transmission component 1206 of the apparatus 1202. For example, the UE may transmit the second uplink transmission multiplexed with the UCI. At least a portion of the second uplink transmission and/or the UCI may be preempted or canceled based on the ULCI. The preemption or cancelation may include a stop without resume or a stop with resume.

Figure 12:
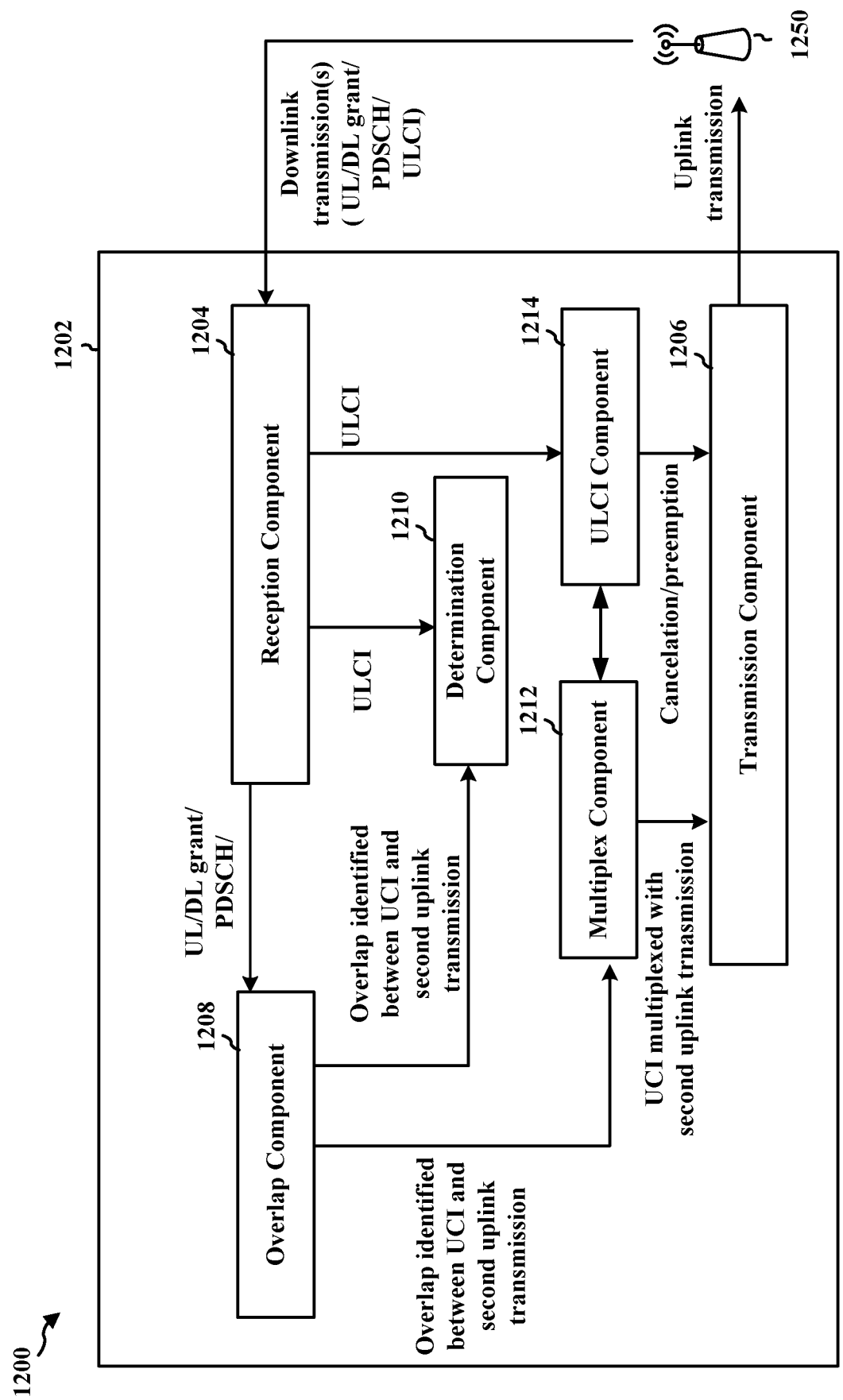
FIG. 12 is a conceptual data flow diagram illustrating the data flow between different means/components in an example apparatus.

FIG. 12 is a conceptual data flow diagram 1200 illustrating the data flow between different means/components in an example apparatus 1202. The apparatus may be a UE or a component of a UE. The apparatus includes a reception component 1204 configured to receive a ULCI from a base station 1250, e.g., as described in connection with 1102 in FIG. 11.

The apparatus 1202 includes an overlap component 1208 configured to identify that an UCI transmission on a PUCCH transmission overlaps with a second uplink transmission, e.g., as described in connection with 1104 in FIG. 11. The apparatus includes a determination component 1210 configured to determine whether to apply the ULCI to the PUCCH transmission and the second uplink transmission before applying a multiplexing rule for multiplexing the UCI with the second uplink transmission, e.g., as described in connection with 1106 of FIG. 11. In some aspects, the determination component 1210 may determine whether to apply the ULCI before applying the multiplexing rule based on an amount of time (e.g., a threshold number of symbols) from receipt of the ULCI to a first symbol of the PUCCH transmission or of the second uplink transmission. The determination component 1210 may use a first threshold number of symbols when at least one of the multiplexing rule or the ULCI is applied to a PUSCH and may use a second threshold number of symbols when the multiplexing rule and the ULCI are not applied to the PUSCH. The apparatus includes a multiplex component 1212 configured to multiplex the UCI with the second uplink transmission by applying the multiplexing rule, e.g., based on 1110 or 1114, according to the determination from the determination component 1210. The apparatus includes a ULCI component 1214 configured to apply the ULCI received by the reception component 1204, e.g., based on 1108 or 1116, according to the determination from the determination component 1210. The apparatus 1202 includes a transmission component 1206 configured to transmit uplink communication to the base station based on the determination of whether to apply the ULCI before applying the multiplexing rule, e.g., as described in connection with 1112 of FIG. 11. For example, the transmission may be based on the ULCI and/or the multiplexing rule.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
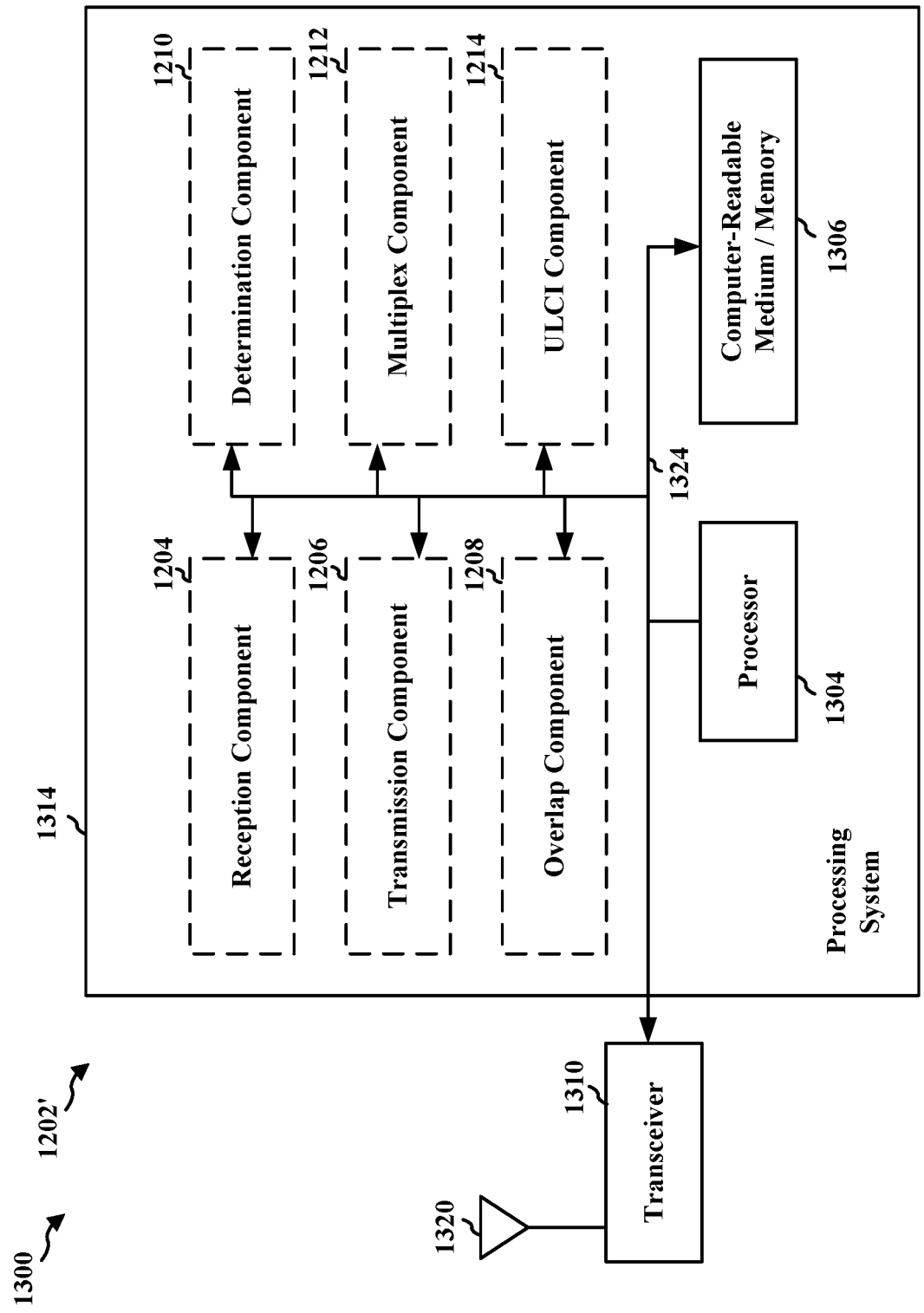
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, 1214, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1214. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359. Alternatively, the processing system 1314 may be the entire UE (e.g., see 350 of FIG. 3).

In one configuration, the apparatus 1202/1202' for wireless communication includes means for receiving a ULCI from a base station. The apparatus includes means for identifying that a UCI transmission on a PUCCH transmission overlaps with a second uplink transmission. The apparatus includes means for determining whether to apply the ULCI to the PUCCH transmission and the second uplink transmission before applying a multiplexing rule for multiplexing the UCI with the second uplink transmission. The apparatus may include means for transmitting uplink communication to the base station based on the ULCI and the multiplexing rule. The apparatus may include means for using a first threshold number of symbols when at least one of the multiplexing rule or the ULCI is applied to a PUSCH and using a second threshold number of symbols when the multiplexing rule and the ULCI are not applied to the PUSCH. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Further disclosure is included in the Appendix.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    receiving an uplink cancellation indication (ULCI) from a base station;
    identifying that a physical uplink control channel (PUCCH) transmission comprising an uplink control information (UCI) overlaps with a second uplink transmission;
    determining whether to apply the ULCI to the PUCCH transmission and the second uplink transmission before applying a multiplexing rule for multiplexing the UCI with the second uplink transmission; and
    transmitting an uplink communication to the base station based on the determination of whether to apply the ULCI before applying the multiplexing rule.

2. The method of claim 1, wherein the UE applies the ULCI after applying the multiplexing rule.

3. The method of claim 2, wherein the second uplink transmission is a physical uplink shared channel (PUSCH)

transmission, and the multiplexing rule is for multiplexing the UCI on the PUSCH transmission.

4. The method of claim 2, wherein the second uplink transmission is a second PUCCH transmission, and the multiplexing rule is for multiplexing the UCI on the second PUCCH transmission.

5. The method of claim 1, wherein the UE determines whether to apply the ULCI before applying the multiplexing rule based on an amount of time from receipt of the ULCI to a first symbol of the PUCCH transmission or of the second uplink transmission.

6. The method of claim 5, wherein the UE applies the ULCI after the multiplexing rule when the ULCI is received less than a threshold number of symbols prior to the first symbol of the PUCCH transmission or of the second uplink transmission.

7. The method of claim 5, wherein the UE applies the ULCI prior to the multiplexing rule when the ULCI is received a threshold number of symbols prior to the first symbol of the PUCCH transmission or the second uplink transmission.

8. The method of claim 7, further comprising:
using a first threshold number of symbols when at least one of the multiplexing rule or the ULCI is applied to a physical uplink shared channel (PUSCH), and
using a second threshold number of symbols when the multiplexing rule and the ULCI are not applied to the PUSCH.

9. The method of claim 7, wherein the threshold number of symbols is based on a processing capability of the UE.

10. The method of claim 7, wherein the threshold number of symbols is based on a threshold of the multiplexing rule.

11. The method of claim 7, wherein the threshold number of symbols is based on a subcarrier spacing of at least one of the PUCCH transmission, the second uplink transmission or a downlink control channel.

12. The method of claim 1, wherein the UE determines whether to apply the ULCI before applying the multiplexing rule based on a priority of a channel.

13. The method of claim 12, wherein the UE applies the ULCI on a first channel before applying the multiplexing rule to resolve a collision between the first channel and a second channel, wherein the first channel has a lower priority than the second channel.

14. An apparatus for wireless communication, comprising:
a memory; and
at least one processor coupled to the memory and configured to:
receive an uplink cancellation indication (ULCI) from a base station;
identify that on a physical uplink control channel (PUCCH) transmission comprising an uplink control information (UCI) overlaps with a second uplink transmission;
determine whether to apply the ULCI to the PUCCH transmission and the second uplink transmission before applying a multiplexing rule for multiplexing the UCI with the second uplink transmission; and
transmit an uplink communication to the base station based on the determination of whether to apply the ULCI before applying the multiplexing rule.

15. The apparatus of claim 14, wherein the apparatus applies the ULCI after applying the multiplexing rule.

16. The apparatus of claim 15, wherein the second uplink transmission is a physical uplink shared channel (PUSCH) transmission, and the multiplexing rule is for multiplexing the UCI with the PUSCH transmission.

17. The apparatus of claim 15, wherein the second uplink transmission is a second PUCCH transmission, and the multiplexing rule is for multiplexing the UCI with the second PUCCH transmission.

18. The apparatus of claim 14, wherein the apparatus determines whether to apply the ULCI before applying the multiplexing rule based on an amount of time from receipt of the ULCI to a first symbol of the PUCCH transmission or of the second uplink transmission.

19. The apparatus of claim 18, wherein the apparatus applies the ULCI after the multiplexing rule when the ULCI is received less than a threshold number of symbols prior to the first symbol of the PUCCH transmission or of the second uplink transmission.

20. The apparatus of claim 18, wherein the apparatus applies the ULCI prior to the multiplexing rule when the ULCI is received a threshold number of symbols prior to the first symbol of the PUCCH transmission or the second uplink transmission.

21. The apparatus of claim 20, wherein the at least one processor is further configured to:
use a first threshold number of symbols when at least one of the multiplexing rule or the ULCI is applied to a physical uplink shared channel (PUSCH), and
use a second threshold number of symbols when the multiplexing rule and the ULCI are not applied to the PUSCH.

22. The apparatus of claim 20, wherein the threshold number of symbols is based on a processing capability of the UE.

23. The apparatus of claim 20, wherein the threshold number of symbols is based on a threshold of the multiplexing rule.

24. The apparatus of claim 20, wherein the threshold number of symbols is based on a subcarrier spacing of at least one of the PUCCH transmission, the second uplink transmission or a downlink control channel.

25. The apparatus of claim 14, wherein the apparatus determines whether to apply the ULCI before applying the multiplexing rule based on a priority of a channel.

26. The apparatus of claim 25, wherein the apparatus applies the ULCI on a first channel before applying the multiplexing rule to resolve a collision between the first channel and a second channel, wherein the first channel has a lower priority than the second channel.

27. An apparatus for wireless communication, comprising:
means for receiving an uplink cancellation indication (ULCI) from a base station;
means for identifying that a physical uplink control channel (PUCCH) transmission comprising an uplink control information (UCI) overlaps with a second uplink transmission;
means for determining whether to apply the ULCI to the PUCCH transmission and the second uplink transmission before applying a multiplexing rule for multiplexing the UCI with the second uplink transmission; and
means for transmitting an uplink communication to the base station based on the determination of whether to apply the ULCI before applying the multiplexing rule.

28. The apparatus of claim 27, wherein the apparatus applies the ULCI after applying the multiplexing rule.

29. The apparatus of claim 28, wherein the second uplink transmission is a physical uplink shared channel (PUSCH)

transmission, and the multiplexing rule is for multiplexing the UCI with the PUSCH transmission.

30. The apparatus of claim 28, wherein the second uplink transmission is a second PUCCH transmission, and the multiplexing rule is for multiplexing the UCI with the second PUCCH transmission.

31. The apparatus of claim 27, wherein the apparatus determines whether to apply the ULCI before applying the multiplexing rule based on an amount of time from receipt of the ULCI to a first symbol of the PUCCH transmission or of the second uplink transmission.

32. The apparatus of claim 31, wherein the apparatus applies the ULCI after the multiplexing rule when the ULCI is received less than a threshold number of symbols prior to the first symbol of the PUCCH transmission or of the second uplink transmission.

33. The apparatus of claim 31, wherein the apparatus applies the ULCI prior to the multiplexing rule when the ULCI is received a threshold number of symbols prior to the first symbol of the PUCCH transmission or the second uplink transmission.

34. The apparatus of claim 33, wherein the apparatus further comprises means for using a first threshold number of symbols when at least one of the multiplexing rule or the ULCI is applied to a physical uplink shared channel (PUSCH) and using a second threshold number of symbols when the multiplexing rule and the ULCI are not applied to the PUSCH.

35. The apparatus of claim 33, wherein the threshold number of symbols is based on a processing capability of the UE.

36. The apparatus of claim 33, wherein the threshold number of symbols is based on a threshold of the multiplexing rule.

37. The apparatus of claim 33, wherein the threshold number of symbols is based on a subcarrier spacing of at least one of the PUCCH transmission, the second uplink transmission or a downlink control channel.

38. The apparatus of claim 27, wherein the apparatus determines whether to apply the ULCI before applying the multiplexing rule based on a priority of a channel.

39. The apparatus of claim 38, wherein the apparatus applies the ULCI on a first channel before applying the multiplexing rule to resolve a collision between the first channel and a second channel, wherein the first channel has a lower priority than the second channel.

40. A non-transitory computer-readable medium storing computer executable code for wireless communication at a user equipment (UE), the code when executed by a processor cause the processor to:
receive an uplink cancellation indication (ULCI) from a base station;
identify that a physical uplink control channel (PUCCH) transmission comprising an uplink control information (UCI) overlaps with a second uplink transmission;
determine whether to apply the ULCI to the PUCCH transmission and the second uplink transmission before applying a multiplexing rule for multiplexing the UCI with the second uplink transmission; and
transmit an uplink communication to the base station based on the determination of whether to apply the ULCI before applying the multiplexing rule.

41. A method of wireless communication at a user equipment (UE), comprising:
receiving an uplink cancellation indication (ULCI) from a base station;
identifying that a physical uplink control channel (PUCCH) transmission comprising an uplink control information (UCI) overlaps with a second uplink transmission;
multiplexing the UCI of the PUCCH transmission on the second uplink transmission; and
cancelling at least a portion of the second uplink transmission based on the ULCI after multiplexing the UCI of the PUCCH transmission on the second uplink transmission.

42. The method of claim 41, wherein the second uplink transmission is a physical uplink shared channel (PUSCH) transmission, and the UE multiplexes the UCI on the PUSCH transmission.

43. The method of claim 41, wherein the second uplink transmission is a second PUCCH transmission, and for the UE multiplexes the UCI on the second PUCCH transmission.

44. The method of claim 41, further comprising receiving a ULCI bitmap, wherein each bit of the ULCI bitmap corresponds to a time and frequency resource, and wherein the UE cancels portions of the second uplink transmission scheduled to be transmitted on time and frequency resources corresponding to bits of the ULCI bitmap with a value of "1".

45. The method of claim 44, wherein the UE cancels any portion of the second uplink transmission scheduled to be transmitted on time and frequency resources after the earliest time and frequency resource corresponding to a bit of the ULCI bitmap with a value of "1".

46. An apparatus for wireless communication, comprising:
means for receiving an uplink cancellation indication (ULCI) from a base station;
means for identifying that a physical uplink control channel (PUCCH) transmission comprising an uplink control information (UCI) overlaps with a second uplink transmission;
means for multiplexing the UCI of the PUCCH transmission on the second uplink transmission; and
means for cancelling at least a portion of the second uplink transmission based on the ULCI after multiplexing the UCI of the PUCCH transmission on the second uplink transmission.

47. The apparatus of claim 46, wherein the second uplink transmission is a physical uplink shared channel (PUSCH) transmission, and the UE multiplexes the UCI on the PUSCH transmission.

48. The apparatus of claim 46, wherein the second uplink transmission is a second PUCCH transmission, and the UE multiplexes the UCI on the second PUCCH transmission.

49. The apparatus of claim 46, further comprising means for receiving a ULCI bitmap, wherein each bit of the ULCI bitmap corresponds to a time and frequency resource, and wherein the UE cancels portions of the second uplink transmission scheduled to be transmitted on time and frequency resources corresponding to bits of the ULCI bitmap with a value of "1".

50. The apparatus of claim 49, wherein the UE cancels any portion of the second uplink transmission scheduled to be transmitted on time and frequency resources after the earliest time and frequency resource corresponding to a bit of the ULCI bitmap with a value of "1".

51. An apparatus for wireless communication comprising:
a memory; and
at least one processor coupled to the memory and configured to:

receive an uplink cancellation indication (ULCI) from a base station;
identify that a physical uplink control channel (PUCCH) transmission comprising an uplink control information (UCI) overlaps with a second uplink transmission;
multiplex the UCI of the PUCCH transmission on the second uplink transmission; and
cancel at least a portion of the second uplink transmission based on the ULCI after multiplexing the UCI of the PUCCH transmission on the second uplink transmission.

52. The apparatus of claim 51, wherein the second uplink transmission is a physical uplink shared channel (PUSCH) transmission, and the UE multiplexes the UCI on the PUSCH transmission.

53. The apparatus of claim 51, wherein the second uplink transmission is a second PUCCH transmission, and the UE multiplexes the UCI on the second PUCCH transmission.

54. The apparatus of claim 51, wherein the at least one processor is further configured to receive a ULCI bitmap, wherein each bit of the ULCI bitmap corresponds to a time and frequency resource, and wherein the UE cancels portions of the second uplink transmission scheduled to be transmitted on time and frequency resources corresponding to bits of the ULCI bitmap with a value of "1".

55. The apparatus of claim 54, wherein the UE cancels any portion of the second uplink transmission scheduled to be transmitted on time and frequency resources after the earliest time and frequency resource corresponding to a bit of the ULCI bitmap with a value of "1".

56. A non-transitory computer-readable medium storing computer executable code for wireless communication at a user equipment (UE), the code when executed by a processor cause the processor to:
receive an uplink cancellation indication (ULCI) from a base station;
identify that a physical uplink control channel (PUCCH) transmission comprising an uplink control information (UCI) overlaps with a second uplink transmission;
multiplex the UCI of the PUCCH transmission on the second uplink transmission; and
cancel at least a portion of the second uplink transmission based on the ULCI after multiplexing the UCI of the PUCCH transmission on the second uplink transmission.

* * * * *